3,208,916
FUEL ELEMENT FOR A NUCLEAR REACTOR
Robert J. Hennig and Duane T. Aase, Richland, Wash., assignors to the United States of America as represented by the United States Atomic Energy Commission
Filed July 6, 1964, Ser. No. 380,720
3 Claims. (Cl. 176—67)

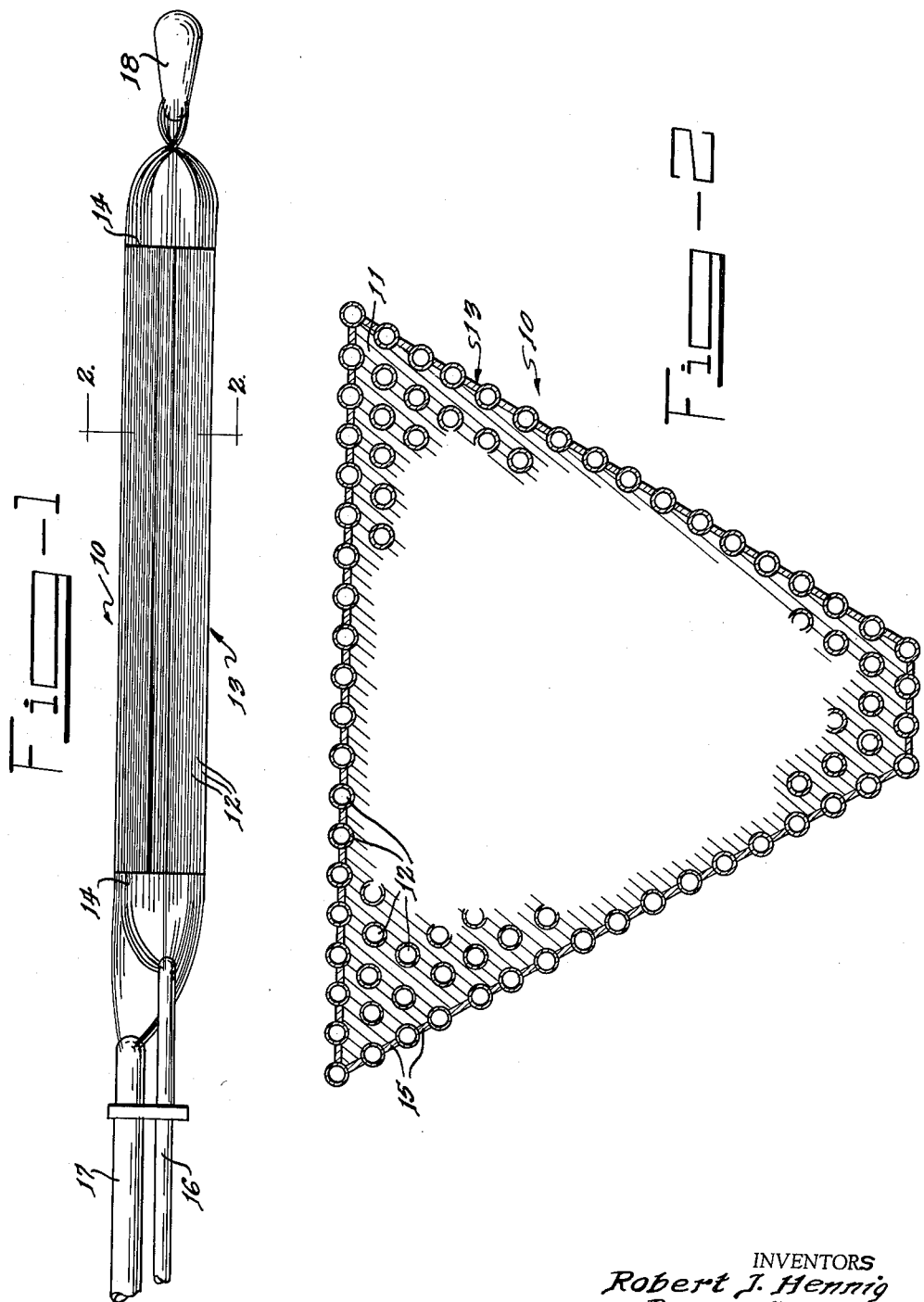

This invention relates to a fuel element for a nuclear reactor which operates predominantly on fast neutrons. In more detail the invention relates to a massive high-endurance, ceramic fuel element which is pierced by many small-diameter, high-pressure coolant tubes.

A thermal reactor incorporating interally cooled fuel elements of this type was disclosed in Patent No. 3,156,625, dated November 10, 1964. According to this disclosure a plurality of these fuel elements are suspended in a pool of water which serves as the moderator for the reactor. This moderator, of course, cools the exterior of the fuel elements while coolant in the pressure tubes cools the interior of the fuel elements. In a fast reactor incorporating similar fuel elements, however, the pool of water is eliminated and the fuel elements are disposed close together. Such a reactor is disclosed and claimed in Patent No. 3,140,237, dated July 7, 1964, which patent discloses but does not claim fuel elements constructed according to the present invention.

While it might be possible to employ the fuel elements of Patent No. 3,156,625 directly in a fast reactor, such use would require the addition of an auxiliary cooling system to cool the outside of the fuel elements. Obviously, incorporation of such an auxiliary system in a reactor would increase the complexity and cost of the reactor.

It is accordingly an object of the present invention to develop a fuel element for a fast reactor which does not require external cooling.

This and other objects of the present invention are attained in a fuel element for a fast reactor incorporating "tube-in-wall" cladding. The fuel comprises a mass of ceramic fuel which is penetrated by a plurality of tubes which are designed to pass coolant at very high temperatures and pressures and which is surrounded by a container or cladding—as it is known in the art—consisting of a plurality of similar pressure tubes which are joined by metal strips.

Reference is now made to the accompanying drawing wherein:

FIG. 1 is an elevation of a fuel element according to the present invention, and FIG. 2 is an enlarged horizontal sectional view thereof.

Referring now to the drawing, the fuel element comprises a prism 10 of 60°–120° trapezoidal shape which includes a mass 11 of ceramic material penetrated by a plurality of equispaced pressure tubes 12 and surrounded by a container or cladding 13 with end pieces 14 being disposed at the ends thereof. Container or cladding 13 consists of the outermost pressure tubes 12 and a plurality of long narrow strips 15 welded to the tubes and extending therebetween and therealong. Tubes 12 and strips 15 may be formed of "Hasteloy-X," a high-temperature nickel-base alloy.

Tubes 12 extend through end pieces 14 to an inlet header 16 above, an outlet header 17 above and a mixing chamber 18 below prism 10. Coolant under high pressure and temperature makes a downward pass from inlet header 16 through those pressure tubes 12 which make up container 13 plus additional tubes 12 to obtain roughly an equal number of downflow and upflow tubes to mixing chamber 18, where the paths join. Mixing chamber 18 serves to average the properties of the coolant before it enters the upflow tubes, thus reducing hot channel factors. Then, from the mixing chamber 18 new individual paths through the remaining tubes 12 extend upward through the prism 10 to outlet header 17. The outer tubes 12 serve to cool the container 13 by virtue of forming a part thereof. This arrangement permits maximum utilization of heat derived from the reactor. Use of process feedwater or steam as container coolant avoids the necessity for gaseous cooling of the container which would be wasteful of heat. It will be noted that two-foot sections of tubes 12 extending between the prism 10 and mixing chamber 18 are bent to obtain relative thermal expansion relief.

The tubes 12 in the container should be orificed to limit the coolant flow to values compatible with both cooling the wall and balancing heat load to maintain reasonable tube temperature in the other parallel downflow tubes in the fuel element.

The cladding temperature can also be reduced in varying amounts by lining the inner surface with insulating material such as $ZrO_2$ and such an expedient may be desirable at certain locations in a reactor, such as in the radial blanket, because of low blanket coolant flow and large coolant tube spacing. Specific details of the fuel element described above will next be given. Prism 10 is sevent feet, three inches in length, has a long side of 10.337 inches and a short side of 1.497 inches. There are 490 tubes 12 in fuel element 10, each of which has an outer diameter of .225 inch and which are spaced .308 inch apart center to center on a triagnular lattice. The composition of the ceramic material in the fuel element forms no part of the present invention and so far as this invention is concerned the fuel element may contain any fissionable material.

It will be understood that the invention is not to be limited to the details given herein but that it may be modified within the scope of the appended claims.

What is claimed is:

1. A fuel element for a fast nuclear reactor comprising a prism containing a fissionable material, a plurality of parallel closely spaced tubes extending lengthwise of the prism through the fissionable material, the outermost tubes of said closely spaced tubes forming part of a wall surrounding said prism.

2. A fuel element for a fast nuclear reactor comprising a prism containing a fissionable material, a plurality of parallel closely spaced tubes extending lengthwise of the prism through the fissionable material, said prism including a container formed of the outermost tubes of said closely spaced tubes and a plurality of long narrow strips welded to these outermost tubes and extending therebetween and therealong.

3. A fuel element for a fast reactor comprising a 60°–120° prism which is 7 feet, 3 inches in length, has a long side of 10.337 inches and a short side of 1.497 inches containing a fissionable material, 490 parallel tubes having an outer diameter of .225 inch spaced .308 inch apart on a triangular lattice extending lengthwise of the prism through the fissionable material, said prism including a container formed of the outermost tubes of said closely spaced tubes and a plurality of long narrow strips welded to these outermost tubes and extending therebetween and therealong.

References Cited by the Examiner

UNITED STATES PATENTS

| | | | |
|---|---|---|---|
| 3,033,773 | 5/62 | Schluderberg et al. | 176—59 |
| 3,076,753 | 2/63 | Bell | 176—61 |
| 3,140,237 | 7/64 | Peterson et al. | 176—18 |
| 3,156,625 | 11/64 | Harty et al. | 176—61 |

CARL D. QUARFORTH, *Primary Examiner.*

L. DEWAYNE RUTLEDGE, *Examiner.*